United States Patent [19]

Suzuki et al.

[11] 3,836,934

[45] Sept. 17, 1974

[54] LENS ASSEMBLY FOR PHOTOGRAPHING AT NEAR OR CLOSE DISTANCE

[75] Inventors: Shogo Suzuki, Tahara; Maki Yamashita, Osaka, both of Japan

[73] Assignee: Minolta Camera Kabushiki Kaisha, Osaka, Japan

[22] Filed: Nov. 29, 1973

[21] Appl. No.: 420,131

[30] Foreign Application Priority Data
Dec. 27, 1972  Japan.................................. 48-4798

[52] U.S. Cl.................. 354/197, 352/140, 354/199, 354/221, 354/222
[51] Int. Cl. .......................................... G03b 13/14
[58] Field of Search ........... 354/221, 197, 222, 167, 354/166, 199; 352/140

[56] References Cited
UNITED STATES PATENTS

| | | | |
|---|---|---|---|
| 1,789,289 | 1/1931 | Azarraga......................... | 354/222 X |
| 2,881,684 | 4/1959 | Brohl et al...................... | 354/221 X |
| 2,917,968 | 12/1959 | Nojiri................................ | 354/222 |
| 2,970,509 | 2/1961 | Barthruff........................... | 354/222 |
| 3,083,628 | 4/1963 | Tsugawa........................ | 354/197 X |
| 3,253,528 | 5/1966 | Bing.................................. | 354/222 X |
| 3,388,650 | 6/1968 | Westphalen.................... | 354/197 X |

*Primary Examiner*—Richard A. Wintercorn
*Attorney, Agent, or Firm*—Wolder & Gross

[57] ABSTRACT

A finder parallax correction lens capable of giving a visual indication, a supplementary lens and a glass protector for the main taking lens are aligned in a planar arrangement and movably built in the camera. When the supplementary lens for photographing subjects at near or close distances is placed in front of the main taking lens with its optical axis in alignment with that of the taking lens, the correction lens is set in position for the finder optical system, visually indicating that it is so positioned, with the glass protector brought to its retracted position. A lock mechanism is further provided which permits the shutter to be tripped only when the lenses and glass protector are set in correct photographing positions respectively and which otherwise locks the shutter against tripping.

6 Claims, 5 Drawing Figures

Fig.2
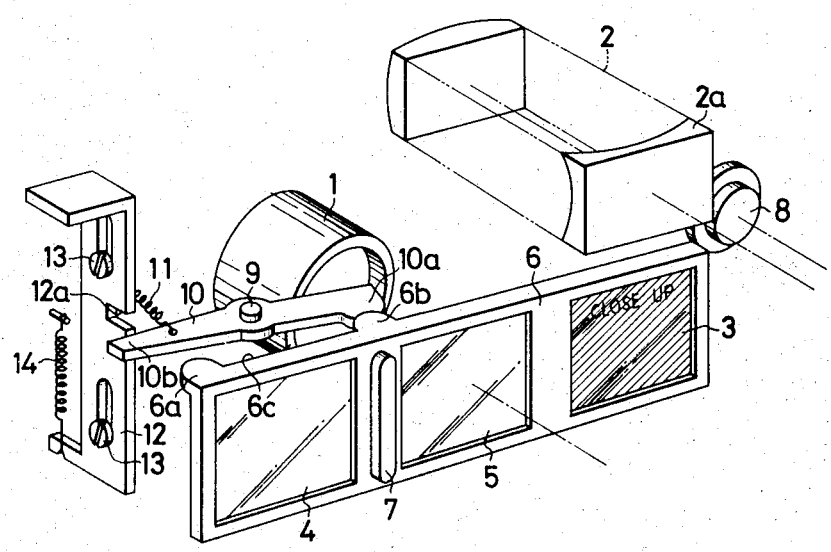
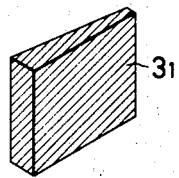
Fig.3a
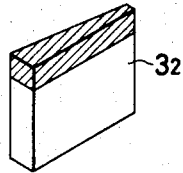
Fig.3b
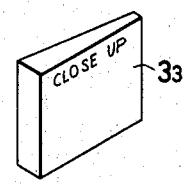
Fig.3c

LENS ASSEMBLY FOR PHOTOGRAPHING AT NEAR OR CLOSE DISTANCE

BACKGROUND OF THE INVENTION

The present invention relates to a lens assembly for cameras, more particularly to a lens assembly to be incorporated in a camera for photographing subjects at near or close distances.

With conventional lens assemblies for photographing near or close subjects, finder parallax is corrected or compensated for using a parallax correction mark, whilst an indication for close-up photography is given by a separate indicating means movable in operative relation to the close-up taking lens.

With close subjects, however, the use of parallax mark takes in a field of view that is displaced greatly relative to the field frame for usual photography, with a corresponding reduction in the field size or increase in the space of path of light. Thus the conventional system for parallax correction renders the camera itself larger in size and is not adapted for compact cameras in particular.

Furthermore when used in cameras of the type wherein the amount of exposure is controlled in response to the light incident on the finder, the system of prior art permits the camera to detect the ambient brightness other than that of the subject, making it impossible to give a proper exposure.

The separate means for indicating close-up photography is complex in construction and results in a cost increase.

Further if a glass protector is disposed in front or rear of a close-up lens attached to a camera incorporating front-the-lens shutter, the close-up lens and glass protector must have substantially high parallelism and planarity to assure a high resolving power for close-up photography. This entails a marked increase in manufacturing cost.

SUMMARY OF THE INVENTION

An object of this invention is to provide a lens assembly for photographing near or close subjects which is capable of correcting finder parallax with a very simple construction when taking near or close subjects and which is therefore especially suitable for use in compact cameras.

Another object of this invention is to provide very simplified indicating means when photographing near or close-up subjects.

Another object of this invention is to simplify the construction of taking lens system for photographing subjects at near or close distances, thereby obviating the factor detrimental to the parallelism of the lens system so as to assure cost reduction.

Another object of this invention is to provide a very simple device for permitting accurate measurement of brightness of subject to be incorporated in cameras in which the amount of exposure is controlled in response to the light incident on the finder.

Another object of this invention is to provide a device for preventing shutter tripping when the lens assembly for photographing near or close-up subjects is not set in correct photographing position so as to avoid a failure in photographic operation.

Another object of this invention is to provide a device which is very easy to operate to quickly effect changeover from ordinary photography to near-distance or close-up photography and vice versa.

To fulfil these objects, the present invention provides a lens assembly including a frame disposed in front of a main taking lens optical system and a finder optical system and so supported as to be selectively shiftable, the frame having mounted therein a finder parallax correction lens, a supplementary lens for photographing subjects at near or close distances and a glass protector for the main taking lens. The lens assembly further has lock means operable with the shifting of the frame to permit the shutter to be tripped only when the lenses and glass protector on the frame are set in correct positions and to otherwise lock the shutter against tripping.

The supplementary lens and the correction lens are so arranged that when the optical axis of the supplementary lens is in alignment with that of the taking lens, the optical axis of the correction lens is in alignment with that of the finder optical system. The correction lens is colored or bears characters to give a visual indication, such that when set in position in front of the finder optical system, the correction lens indicates in the finder field that the supplementary lens is positioned correctly in front of the taking lens.

According to this invention, therefore, the frame is shifted to place one of the supplementary lens and the glass protector selectively in front of the main taking lens, whereby the camera is made ready for ordinary photography or near-distance (close-up) photography without the necessity to use another independent indicating means when photographing near subjects. Thus the present device has an extremely simplified construction.

Moreover, the lens assembly has overcome all the problems, such as reduction in the field size, increase in the camera size and improper exposure amount, which are encountered in correcting the finder parallax involved in photographing near or close subjects. The present device further eliminates such error that an ordinary photograph is taken with the supplementary lens placed in front of the main taking lens.

When near subjects are to be photographed by a camera of the front-the-lens shutter type incorporating the present assembly, the glass protector for the main taking lens is retracted sidewise from the taking lens, so that the optical system for such photographing operation will be composed of the two elements of supplementary lens and main taking lens, whereas the conventional system includes the three elements of supplementary lens, glass protector and main taking lens. The present device therefore mitigates the factors to reduce the resolving power of the lens and assures high resolving power.

Furthermore, the present device prevents shutter tripping insofar as the supplementary lens, finder parallax correction lens and glass protector are not set in correct photographing positions, thereby obviating failures in photographing operation to make the camera very easy to use.

Since the lens assembly of this invention is exceedingly simple in construction, it is especially suitable for compact cameras and inexpensive to make.

Other objects and features of this invention will become more apparent from the following description of the preferred embodiment.

BRIEF DESCRIPTION OF THE DRAWINGS

FIG. 2 is a perspective view of the same as it is set for ordinary photography; and FIGS. 3(a), (b) and (c) are perspective views showing examples of finder parallax correction lens respectively.

DESCRIPTION OF THE PREFERRED EMBODIMENT

Figure 1:
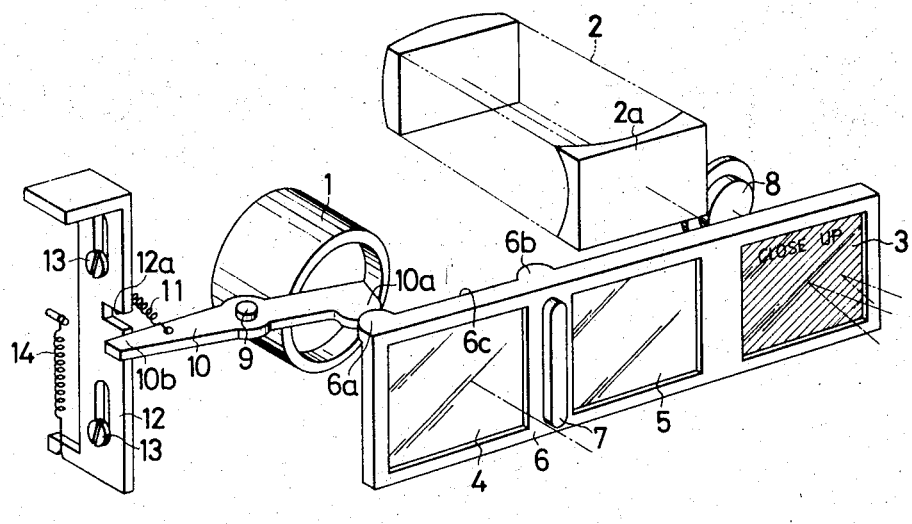
FIG. 1 is a perspective view showing the principal part only of an embodiment of this invention as it is set for photographing near subjects.

With reference to an embodiment shown in the drawings, a main taking lens 1 and finder optical system 2 are built in an unillustrated camera body. A finder parallax correction lens 3, a supplementary lens 4 for photographing subjects at near or close distances and a glass protector 5 for the main taking lens 1 are arranged side by side, for example, in the same plane and are mounted on a frame 6 supported slidably in its longitudinal direction and housed in the camera body. By gripping and moving the knob 7 on the frame 6, the lenses 3, 4 and protector 5 are shifted as desired in front of the main taking lens 1 and finder optical system 2.

The supplementary lens 4 and the glass protector 5 are so arranged that when shifted as above they are selectively placed in front of the main taking lens 1 respectively, with their optical axes in alignment with each other. The finder parallax correction lens 3 is positionable in front of the objective 2a of the finder optical system 2 with their optical axes in alignment with each other, only when the supplementary lens 4 is set correctly in front of the main taking lens 1. Otherwise, the correction lens 3 is placed out of the light path of the finder optical system 2.

The finder parallax correction lens 3 comprises a Fresnel lens, wedge-shaped lens, cylindrical lens or the like and is colored and bears the characters "CLOSE UP" or the like as seen in FIG. 1 so as to make the lens 3 capable of giving a visual indication within the finder field that the lens assembly is set for near-distance or close-up photography. The lens 3 functions for compensation to adapt the finder optical system for near-distance or close-up photography.

Consequently, it can be readily ascertained in the finder field whether or not the supplementary lens 4 is positioned in place for photographing near or close subjects, free of possible failure to take a photograph. Furthermore, the finder parallax correction lens 3 covers the whole finder field and makes it possible to compensate for the parallax for the whole incident light on the finder even if the subject distance is very short. Thus the lens assembly has overcome all the drawbacks of conventional cameras, such as reduction in the field size, increased space for light path which renders the camera itself larger or failure to assure proper exposure experienced with a camera in which the amount of exposure is controlled in response to the incident light on the finder received by a photocell 8.

The finder parallax correction lens 3 may be wholly colored as indicated at $3_1$ in FIG. 3(a), or partially colored as indicated at $3_2$ in FIG. 3(b), or may bear only characters such as "CLOSE UP" marked thereon as indicated at $3_3$ in FIG. 3(c). These examples of the lens 3 can serve the same purposes as described above.

Conveniently, the frame 6 may be adapted to mount a finder parallax lens having a desired correction rate in interchangeable manner.

The frame 6 is formed at suitable portions of its rear surface 6c with two projections 6a and 6b. A latch lever 10 pivoted by a pin 9 and urged by a spring 11 in a clockwise direction has a projection 10a at its front end for sliding contact with the rear surface 6c and projections 6a and 6b.

The frame 6 is slidingly moved to bring the finder parallax correction lens 3 to the position where it is optically in register with the finder 2, with the supplementary lens 4 also brought into register with the main taking lens 1 optically at the same time, whereby the projection 6a is brought into engagement with the projection 10a of the latch lever 10 as illustrated in FIG. 1. Likewise, when the glass protector 5 is set correctly in front of the main taking lens 1, the projection 6b engages the projection 10a of the latch lever 10 as seen in FIG. 2.

The latch lever 10 has a rear end 10b engageable in and disengageable from a notch 12a in a release member 12. The engagement of the projection 10a with the projections 6a and 6b on the frame 6 brings the rear end 10b out of the notch 12a, whereas when the front end 10a is in sliding contact with the rear face 6c of the frame 6, the rear end 10b is in engagement with the notch 12a, locking the release member 12 to prevent shutter tripping. Briefly, the latch member 10 detects the positions of the lenses 3, 4 and glass protector 5 through the frame 6, thus acting as a lock member to prevent shutter tripping unless they are positioned correctly.

Preferably, the front end projection 10a may be recessed as illustrated to provide click stops in engagement with the projections 6a and 6b. The clicks can then be felt to confirm the setting of the lenses 3, 4 and glass protector 5.

The release member 12 is supported by guide pins 13 in upwardly and downwardly movable manner and urged upward by a spring 14. When moved downward, the release member 12 trips the shutter as already well known.

Of course, the projecting portions 6a and 6b of the frame 6 may alternatively be recessed for engagement with the front end projection 10a of the latch lever 10.

FIG. 1 shows the supplementary lens 4 for near-distance photography as positioned in front of the main taking lens 1 with their optical axes in alignment with each other by slidingly shifting the frame 6. In this state, the glass protector 5 for the main taking lens has been retracted to a position between the main taking lens 1 and the finder optical system 2, the taking lens system thus being composed of the two elements of main taking lens 1 and supplementary lens 4 without the glass protector being interposed therebetween. The finder parallax correction lens 3 is located in front of the objective lens 2a of the finder optical system 2, compensating for the finder parallax to correctly take in the whole subject at a near distance, while giving the indication that the lens assembly is in condition for photographing the near subject. With cameras incorporating means for controlling the exposure amount in response to the incident light on the finder, the lens assembly permits the photocell 8 to detect the brightness of subject accurately and to thereby determine a proper amount of exposure. Further the latch lever 10 renders the shutter releasable. The supplementary lens 4 for photographing near subjects will be replaced by a supplementary lens for close-up photography to photograph close subjects.

The frame 6 is shifted to place the glass protector 5 in front of the main taking lens 1 for ordinary photography as illustrated in FIG. 2. In this state, the supplementary lens 4 has completely been retracted from its set position in front of the main taking lens 1, with the finder parallax correction lens 3 also retracted from the front of finder optical system 2. The glass protector 5 positioned correctly in front of the main taking lens 1 permits the shutter to be tripped.

If the lenses 3, 4 or the glass protector 5 were not positioned in place in each of the foregoing states for taking photographs, the front end projection 10a of the latch lever 10 would be in contact with the rear surface 6c of the frame 6 under the action of the spring 11, with the rear end 10b engaging in the notch 12a of the release member 12, thereby preventing shutter tripping action.

The glass protector 5 for the main taking lens may be removed from the frame 6 to leave the corresponding portion open merely as a window. However, with cameras of the so-called front-the-lens shutter type wherein the shutter is disposed in front of the main taking lens 1, the glass protector 5 serves very effectively to protect the shutter from dust and damage. The construction that the glass protector is removable from the taking optical system when photographing near to close subjects helps simplify the lens system and assure high resolving power.

What is claimed is:

1. A lens assembly in a camera for photographing subjects at near or close distances comprising:
   a finder parallax correction lens capable of giving a visual indication,
   a supplementary lens for photographing subjects at near or close distances,
   a glass protector for a main taking lens,
   a frame movably disposed in the camera main body and holding therein the finder parallax correction lens and the supplementary lens in such arrangement that when the supplementary lens is positioned in front of the main taking lens with their optical axes in alignment with each other, the finder parallax correction lens is positioned in front of the finder optical system with their optical axes in alignment with each other, the frame further holding the glass protector in planar relation to the finder parallax correction lens and the supplementary lens, and
   lock means for detecting the position of the frame to permit shutter tripping only when the glass protector and the combination of the finder parallax correction lens and the supplementary lens are set in correct photographing positions respectively.

2. The lens assembly as set forth in claim 1 wherein the finder parallax correction lens is colored to give the visual indication.

3. The lens assembly as set forth in claim 1 wherein the finder parallax correction lens bears characters marked thereon to give the visual indication.

4. The lens assembly as set forth in claim 1 wherein the finder parallax correction lens is colored in combination with characters marked thereon to give the visual indication.

5. The lens assembly as set forth in claim 1 wherein the lock means comprises a latch member operable to unlatch a release member only when the glass protector and the combination of the finder parallax correction lens and the supplementary lens are set in correct photographing positions respectively and to otherwise latch the release member against movement.

6. A lens assembly in a camera for photographing subjects at near or close distances comprising:
   a finder parallax correction lens capable of giving a visual indication,
   a supplementary lens for photographing subjects at near or close distances,
   a frame movably disposed in the camera main body and holding therein the finder parallax correction lens and the supplementary lens in such arrangement that when the supplementary lens is positioned in front of the main taking lens with their optical axes in alignment with each other, the finder parallax correction lens is positioned in front of the finder optical system with their optical axes in alignment with each other, and
   lock means for detecting the position of the frame to permit shutter tripping only when the combination of the finder parallax correction lens and the supplementary lens is set in correct photographing position.

* * * * *